United States Patent [19]

Fontana

[11] Patent Number: 4,573,393

[45] Date of Patent: Mar. 4, 1986

[54] BOX DISTRIBUTOR FOR SEQUENTIALLY DISCHARGING OBJECTS FROM AIRCRAFT AND LANDCRAFT MEANS

[75] Inventor: Ludovico Fontana, Bari, Italy

[73] Assignee: Tecnovar Italiana S.p.A., Bari, Italy

[21] Appl. No.: 575,540

[22] Filed: Jan. 31, 1984

[51] Int. Cl.[4] .......................... F41F 5/02; B65D 7/26

[52] U.S. Cl. ........................................ 89/1.59; 220/6; 220/7

[58] Field of Search .................. 89/1.51, 1.58, 1.59; 220/19, 6, 7; 244/137 R; 221/90

[56] References Cited

U.S. PATENT DOCUMENTS

| | | | |
|---|---|---|---|
| 811,047 | 1/1906 | Fowler | 220/7 |
| 1,215,292 | 2/1917 | McKay | 220/7 |
| 1,574,904 | 3/1926 | Kucera | 220/7 X |
| 2,379,383 | 6/1945 | Steel | 89/1.59 |
| 3,126,123 | 3/1964 | Pickering | 221/90 X |
| 3,529,745 | 9/1970 | Freeman et al. | 221/90 |
| 4,162,737 | 7/1979 | Clive-Smith | 220/7 X |
| 4,171,664 | 10/1979 | Ball | 89/1.59 |
| 4,314,686 | 2/1982 | März | 220/6 X |
| 4,355,732 | 10/1982 | Nessfield | 220/7 X |

FOREIGN PATENT DOCUMENTS 516367  1/1940  United Kingdom ............. 89/1.5 H

Primary Examiner—David H. Brown
Attorney, Agent, or Firm—Young & Thompson

[57] ABSTRACT

The invention relates to a box distributor for sequentially discharging objects from aircraft and landcraft, particularly for sowing mines from helicopters. The distributor comprises a box-shaped framework with a plurality of vertical compartments closed at the base by shutters (1) tilting under control, the box-shaped framework being formed of a rigid box-shaped base (B), in which are housed the tilting bottom shutters (1) and their respective controls. Two sidewalls (P) are hinged on the two opposed longitudinal edges of the base, and a top wall (T) is releasably fixed at the top of the sidewalls of the box. For transport, the top wall is housed under the box-shaped base (B), while the sidewalls (P) are turned one over the other above the upper face of the base.

9 Claims, 9 Drawing Figures

BOX DISTRIBUTOR FOR SEQUENTIALLY DISCHARGING OBJECTS FROM AIRCRAFT AND LANDCRAFT MEANS

BACKGROUND OF THE INVENTION

The present invention relates to a distributor for sequentially discharging objects, especially mines, from aircraft and landcraft means, especially helicopters.

Distributors of this type are already known for a distributing or so-called "sowing" operation. They are generally formed as large boxes containing a plurality of vertical compartments, each closed at the bottom by a tilting shutter and each housing the objects to be sown which, on opening of the bottom shutter, are discharged from the distributor by their own weight. Box distributors of this type are usually hung underneath a helicopter, which carries the same over the spot where the objects have to be sown, whereupon the sequential opening of all the bottom shutters is effected.

These box distributors, though perfectly functional, are however quite heavy and bulky and this determines certain restrictions in use. When having to carry out a vast sowing operation, a plurality of distributing boxes is conveyed near the sowing field by means of huge trucks. Here the vertical compartments are filled with the objects to be sown, for instance mines, and the boxes are then lifted with a helicopter—or with some other special transport means—and conveyed over the chosen spot where sowing is carried out.

This procedure is however subject to restrictions, on the one hand because the huge trucks cannot reach any place, but only those which can be reached through roads, and on the other hand because it is a rather slow procedure, owing to the slow movements of the trucks.

On the other hand, it is unthinkable that such boxes may be transported over long distances, hanging from a helicopter, since this would involve high costs as well as higher risks. Furthermore, such a weight, hanging under a helicopter, would considerably reduce its speed, whereby there would scarcely be any saving of time.

SUMMARY OF THE INVENTION

The object of the present invention is to realize a distributor, equally or even more functional than the known box distributors, but being at the same time of limited weight and size, so that it may be transported inside a helicopter.

This result is achieved due to the fact that said distributor is formed of a stiff box-shaped base, in which are housed the tilting bottom shutters and the respective control means, of two sidewalls hinged on the two longitudinal opposite edges of the base, and of a top wall, releasably fixed to the top of said sidewalls, and to the fact that, for transport, said top wall is released from the sidewalls and anchored beneath the box-shaped base, while the sidewalls are turned one over the other, above the upper face of said stiff base.

This structure thus allows obtaining a box distributor which, under conditions of non use, appears as a very compact, scarcely bulky and not so heavy unit, so as to be perfectly suited for transport inside a helicopter, leaving furthermore sufficient free space to allow also the transport of the objects having to be sown.

According to a further characteristic of the present invention, rails are fixed on the upper face of the stiff base and on the lower face of the top wall, stiff containers forming said vertical compartments for the objects to be sown being guided and anchored along said rails.

The advantage of this characteristic of the distributor according to the invention lies in the fact that the objects to be sown can be prearranged in said containers and, upon arrival of the empty distributor, said containers can be mounted in the box distributor in a very short period of time.

According to an even further important characteristic of the invention, with the tilting bottom shutters of the base there are associated release means, allowing opening said shutters for discharge and sowing, as well as means for resetting the closed position, acting at the end of the sowing operation.

This arrangement allows obtaining the important advantage that the objects which may accidentally have remained inside the respective vertical compartment, after the sowing operation, can in no case be discharged on unforeseen and undesired grounds, because the bottom shutter has automatically returned to a closed position and it stays locked in this position up to a subsequent manual operation thereof.

BRIEF DESCRIPTION OF THE DRAWINGS

Further characteristics and advantages of the distributor according to the present invention will be more evident from the following description of a preferred embodiment thereof, illustrated in the accompanying drawings, in which.

DESCRIPTION OF THE PREFERRED EMBODIMENT

Figure 1:
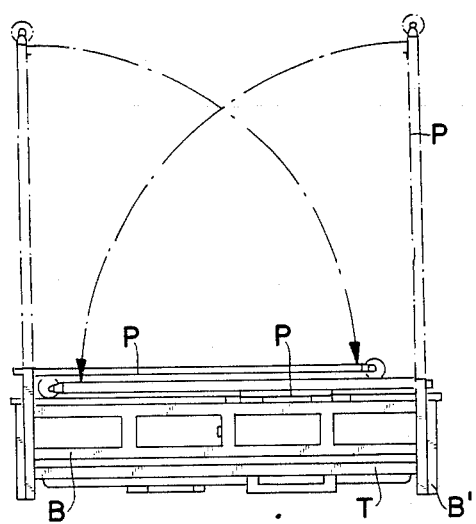
FIG. 1 is an elevation view of the closed distributor, ready for transport inside a helicopter.
Figure 3:
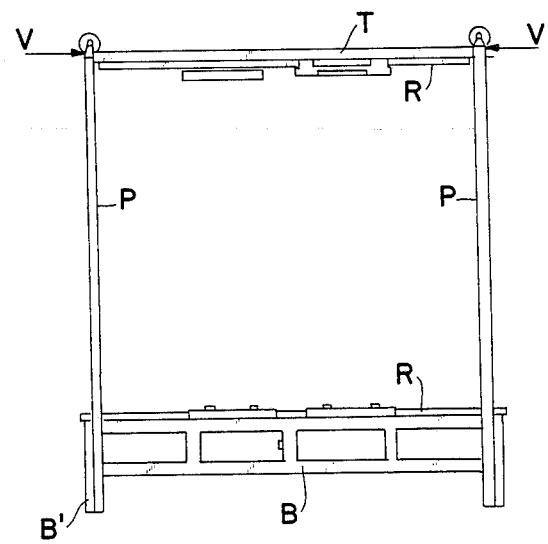
FIG. 3 is an elevation view of the open distributor, ready to house the containers of the objects to be discharged.
Figure 2:
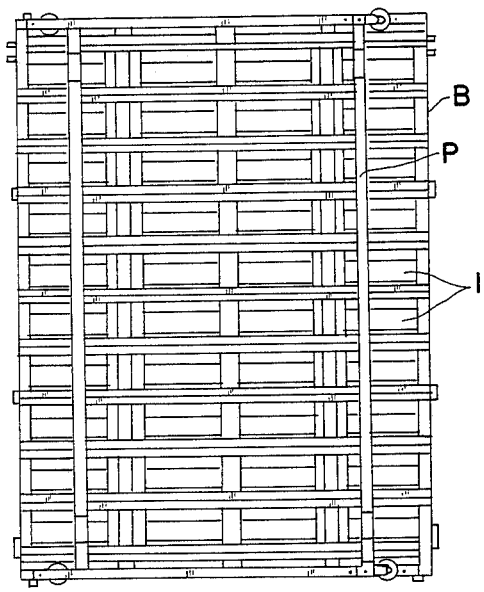
FIG. 2 is a plan view of the distributor, also closed.
Figure 4:
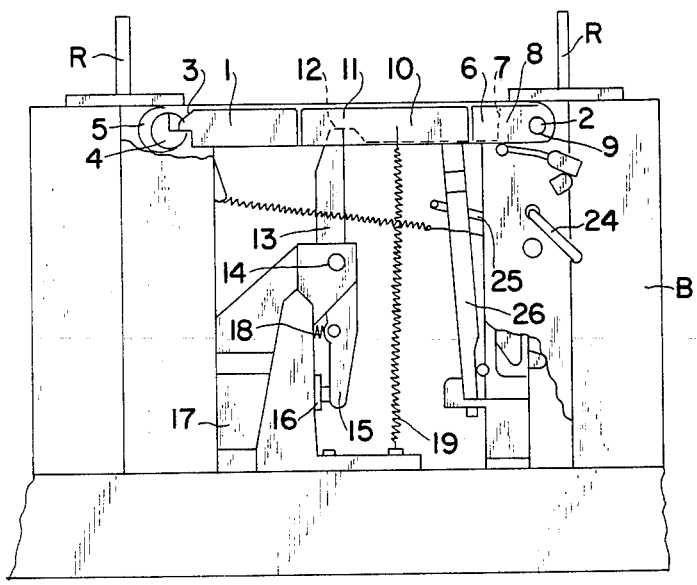
FIGS. 4 and 5 are a part section elevation view and, respectively, a plan view, of the tilting bottom shutter and of the control means thereof, in a closed shutter position.
Figure 5:
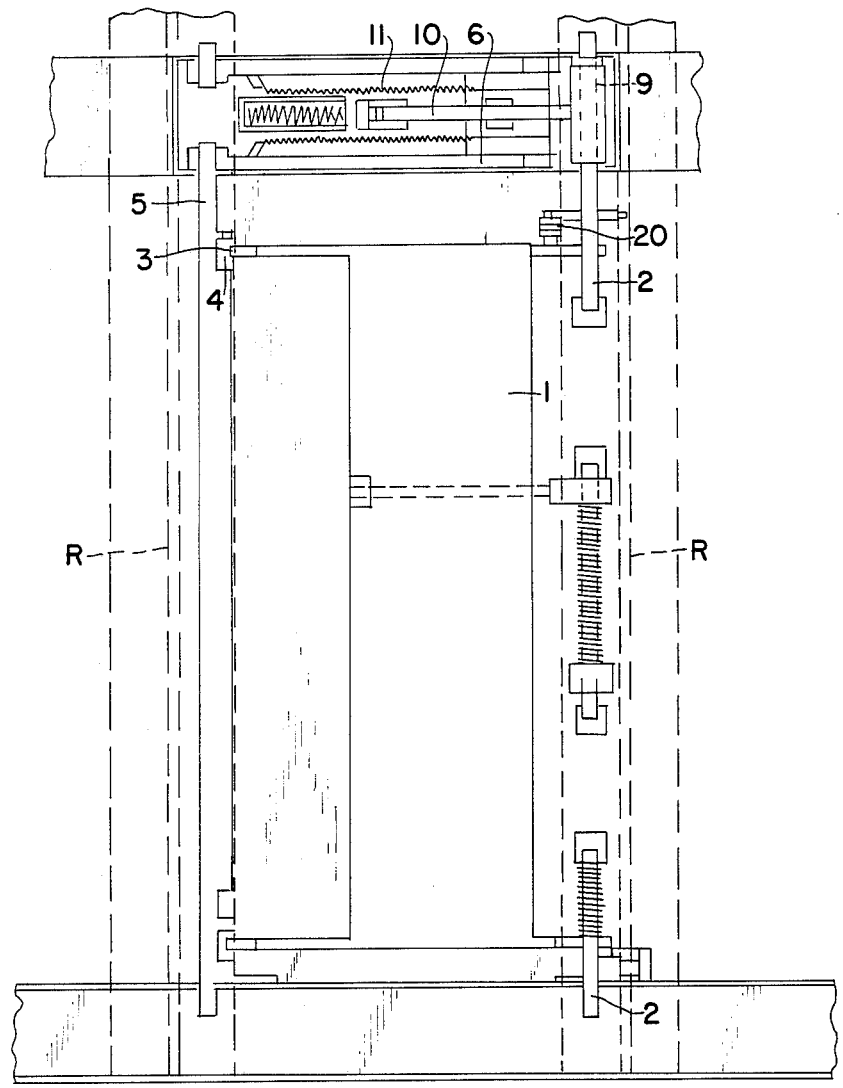
Figure 6:
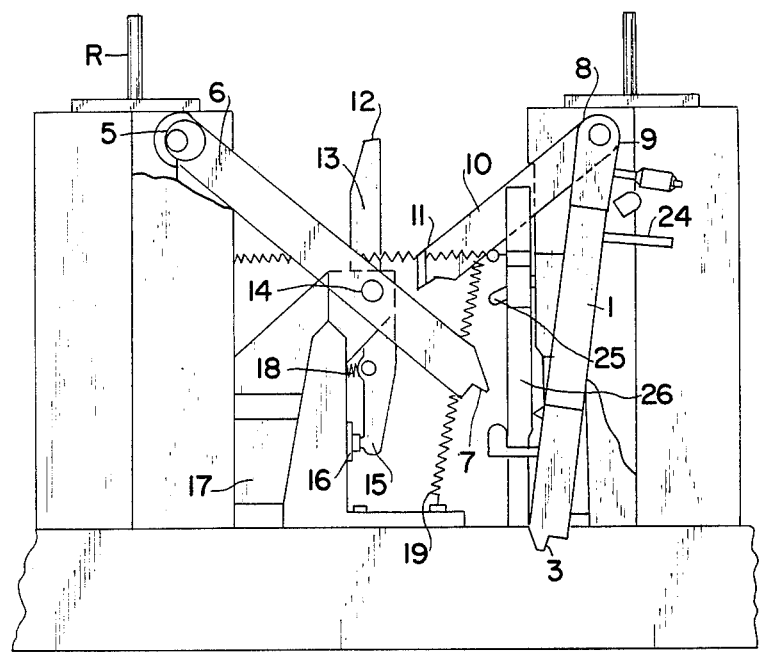
FIGS. 6 and 7 are views similar to those of FIGS. 4 and 5, but with the shutter in an open position.

As shown in FIGS. 1 to 3, the box distributor comprises a stiff box-shaped base B, in which are arranged—as better illustrated hereinafter—the closing tilting bottom shutters 1 and their respective control means.

Along the upper longitudinal edges of the base B are hinged the sidewalls P, which may turn by 90° to move from a raised position of use (see FIG. 3), perpendicular to the base B, to a horizontal stored position of transport, placed one upon the other (see FIG. 1) over the upper face of the base.

A framework T, forming an upper wall of the box, is rigidly fixed to the top of the sidewalls P in the position of use (FIG. 3), while in the position of compact transport, said framework is anchored under the base B, in the space available between the lower face of said base and the plane defined by the ends of the feet B' of the base itself.

As can easily be seen from FIG. 1, the structure of the distributor according to the invention appears extremely compact when folded over, so as to easily find room inside a transport helicopter.

In the configuration ready for use, shown in FIG. 3, the framework T is firmly fixed to the top of the walls P by means of bolts V, as well as by means of brackets (not shown in detail), in order to obtain a perfectly rigid structure.

In this configuration, the distributor allows, introducing, on one side, modular containers in the form of vertical compartments (not shown in detail, as not forming part of the present invention), in which are contained the objects to be sown. Said containers are guided into the structure of the box distributor along rails R and are fixed on these latter. The containers are stiff themselves, so that they cooperate to keep the box structure in a rigid position.

Each of the containers, essentially in the form of a vertical compartment open at the base and at the top, is temporarily closed at the bottom by at least a removable transverse pin, before introduction of the objects to be sown. Once the container has been introduced into the box distributor and has been anchored along said fixing rails, the pin is removed. In this way, the objects to be sown rest directly on the bottom shutter—better described hereinafter—of the base B, which is now closed.

FIGS. 4 to 9 show, in further detail, one of the bottom closing shutters of the base B.

The shutter 1, hinged about axes 2, has two extension arms with ends 3, which bear on notches 4 of a shaft 5, parallel and opposite to the axes 2.

An arm 6 is keyed at one end to the shaft 5, the end 7 of said arm bearing on the tooth 8 of a stop block 9. Said block 9 is rotatable about its own axis and a control lever 10 is fixedly connected thereto.

The end 11 of said lever 10 bears in turn on the upper end 12 of a rocking lever 13, rotatable about the pin 14. The keeper 16 of an electromagnet 17 acts on the lower end 15 of said rocking lever 13, against the action of spring means 18 returning said lever 13 to the position shown in FIG. 4, in which its upper end 12 engages under the end 11 of the lever 10.

When the electromagnet 17 is energized, it presses the end 15 of the rocking lever 13, which thus performs a counterclockwise rotation. Due to this rotation of the rocking lever 13, its end 12 disengages from the end 11 of the lever 10 which, stressed by the spring 19, rotates downward. This rotation determines in turn the disengagement of the block 9 from the end 7 of the arm 6 which, through its own weight and through the pressure imparted by the shutter 1 on the notches 4 of the shaft 5, performs a downward clockwise rotation.

Due to this rotation, the notches 4 free the ends 3 of the shutter arms and the shutter is then free to perform in turn a downward counterclockwise rotation (FIGS. 6 and 7), under the combined pressure of the objects to be sown, bearing on said shutter, and of the spring 20.

During the counterclockwise rotation, opening the shutter 1, the torsion spring 22 is loaded for the operation better described hereinafter.

Figure 7:
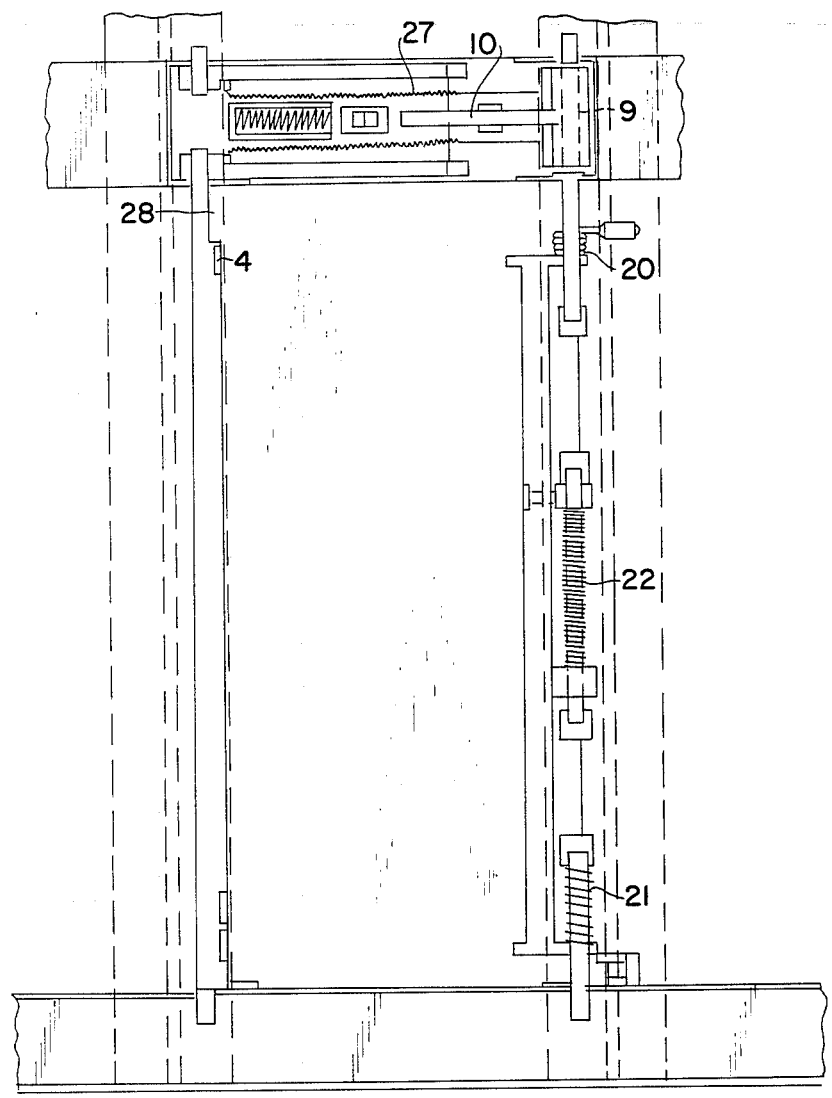
Figure 8:
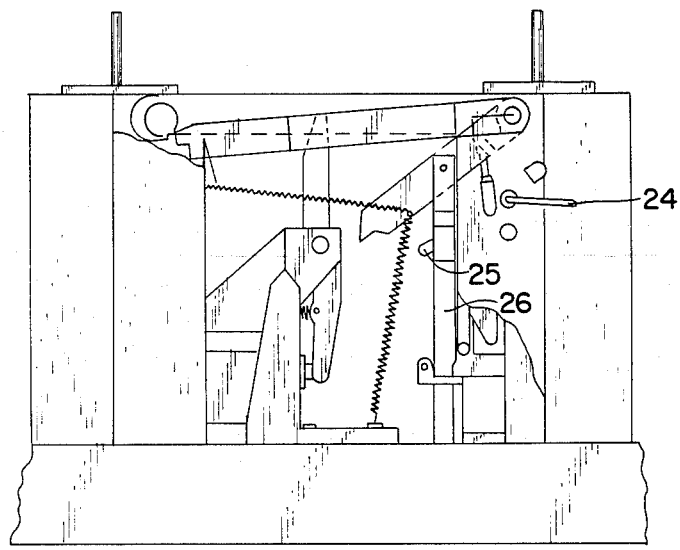
FIGS. 8 and 9 are further views similar to those of FIGS. 4 and 5, with the shutter in a reclosing position.

In this downwardly turned position of the shutter, the passage is completely free, as shown in FIG. 7, and the objects lying on and resting over the shutter, as already said, can be freely discharged as dead load below the base 1 of the distributor.

Figure 9:
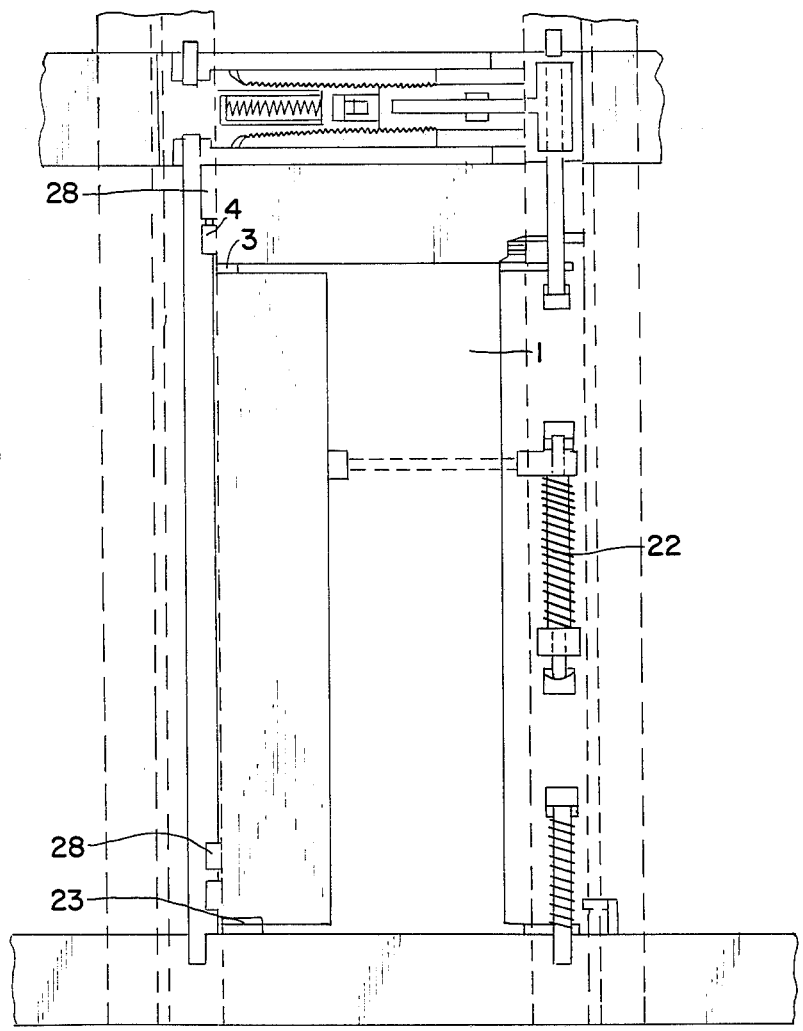

During the discharge of the objects, for the sowing operation, the action of the spring 21 shifts the shutter in the direction of its length, i.e. parallel to the axes 2, to the position shown in FIG. 9.

When the shutter 1 reaches this position, it is freed from the downward pressing action of the spring 20. Once it has also been freed from the weight of the objects which have been discharged, the shutter can return to the closed position, under the action of the spring 22 which, as said, had been loaded during opening of the shutter. In this upward movement, the shutter shifts beyond the ratchet 23, on which it subsequently bears. This ratchet makes such that the shutter is kept in said reclosing position up to the following manual operation for preparing the distributor for a subsequent sowing operation.

This automatic reclosing of the shutter 1 is very important, as it makes such that any objects left by accident in the vertical compartment during the sowing operation, may in no case be dropped out at the wrong moment or in the wrong places, on account of the fact that the shutter cannot be opened again until, as said, a special manual operation is carried out.

To prepare the distributor for a subsequent sowing operation, the following steps are performed: the lever 25 is caused to rotate clockwise, by manual control of the handle 24. Said lever 25 acts on the rod 26, pivoted at its upper end to a central portion of the lever 10 (see FIG. 6), to cause the upward clockwise rotation of this lever 10: in this way, the block 9 and the tooth 8 are returned to a locked position. At the end of its upward movement, the lever 10 again carries its end 11 into engagement with the upper end 12 of the rocking lever 13, which has already returned to its initial locking position, thanks to the action of the spring 18.

Previously, also the arm 6, returned by the respective spring 27, had taken up a raised position, close to the initial position, so that, as the lever 10 moves up, the end 7 of said arm is in such a position as to automatically engage with the tooth 8 of the block 9.

At this point, to return the shutter 1 to the initial closed position, it is necessary to cause it to slide backward, by manual control and against the action of the spring 21, until the ends 3 reach the passage spaces 28 formed in the shaft 5, simultaneously loading the spring 21. At the same time, the shutter 1 returns into engagement with the spring 20.

The spring 21 then returns the shutter 1, to the initial closed position, causing the ends 3 of its arms to again engage in the notches 4 of the shaft 5. From this moment, the shutter is ready for a new sowing operation.

It is to be understood that the invention is not limited to the particular embodiment described, but that there may be many other embodiments differing from the same, all within reach of a technician skilled in the art and, in any case, all falling within the protection scope of the invention itself.

I claim:

1. In a distributor for sequentially discharging objects from landcraft or aircraft means, of the type comprising a box-shaped framework with a plurality of vertical compartments, closed at the base by shutters, and control means for selectively opening said shutters; the improvement in which said distributor is a stiff box-shaped base, in which are housed said shutters and control means, two sidewalls hinged on the two longitudinal opposite edges of the base, a top wall detachably secured to the top of said sidewalls, and for transport, means for releasably retaining said top wall beneath the box-shaped base when the top wall is detached from the side walls, while the sidewalls are turned one over the other, above the upper face of said base.

2. A distributor as in claim 1, wherein the upper face of the base and the lower face of the top wall are provided with rails for guiding and anchoring a plurality of stiff containers, forming said vertical compartments for the objects to be discharged, said compartments being closed by said shutters.

3. A distributor as in claim 1, in which said base is supported on four feet, and said top wall when housed beneath said base is disposed above a plane defined by the lower ends of said feet.

4. A distributor as in claim 1, wherein each of the shutters is hinged on one of its sides, support arms projecting from the opposite side of each shutter, the ends of said arms resting on notches in a rotary shaft.

5. A distributor as in claim 4, and a control lever keyed to said notched shaft, said control lever causing the rotation of said shaft to free said shutter support arms.

6. A distributor as in claim 4, wherein said shutter is rotatable about a hinge, when opening, under the combined action of a first torsion spring exerting a downward pressure and of the objects to be distributed bearing on said shutter.

7. A distributor as in claim 1, and release means allowing opening said shutters for discharge of the objects to be distributed, and means for resetting the shutters in a closed position.

8. A distributor as in claim 7, wherein said means for resetting the shutter in the closed position are formed by a torsion spring associated with a hinge of said shutter, said torsion spring being loaded upon opening of the shutter.

9. A distributor as in claim 8, and an axial spring also associated with the hinge of the shutter for shifting said shutter along the axis of said hinge, in an open shutter position, in order to release the shutter from said torsion spring.

* * * * *

UNITED STATES PATENT AND TRADEMARK OFFICE
CERTIFICATE OF CORRECTION

PATENT NO. : 4,573,393
DATED : March 4, 1986
INVENTOR(S) : Ludovico FONTANA

It is certified that error appears in the above—identified patent and that said Letters Patent is hereby corrected as shown below:

On the cover sheet, after [22] insert:

--[30]   Foreign Application Priority Data

February 4, 1983   [IT]   Italy ............... 19432 A/83--

Signed and Sealed this

Second Day of September 1986

[SEAL]

Attest:

DONALD J. QUIGG

Attesting Officer

Commissioner of Patents and Trademarks